United States Patent [19]
Sprague

[11] Patent Number: 5,646,696
[45] Date of Patent: Jul. 8, 1997

[54] CONTINUOUSLY CHANGING IMAGE SCALING PERFORMED BY INCREMENTED PIXEL INTERPOLATION

[75] Inventor: David L. Sprague, Trenton, N.J.

[73] Assignee: Intel Corporation, Santa Clara, Calif.

[21] Appl. No.: 654,020

[22] Filed: May 28, 1996

Related U.S. Application Data

[63] Continuation of Ser. No. 461,547, Jun. 5, 1995, abandoned, which is a continuation of Ser. No. 267,846, Jun. 29, 1994, abandoned, which is a continuation of Ser. No. 995,288, Dec. 23, 1992, abandoned.

[51] Int. Cl.$^6$ .................................................. H04N 9/74
[52] U.S. Cl. ...................... 348/458; 348/581; 348/448
[58] Field of Search .......................... 348/581, 458, 348/439, 448; 344/129, 130; H04N 9/74

[56] References Cited

U.S. PATENT DOCUMENTS

| | | | |
|---|---|---|---|
| 4,163,249 | 7/1979 | Michael et al. | 358/22 |
| 4,282,546 | 8/1981 | Reitmeier | 358/22 |
| 4,402,012 | 8/1983 | Knight | 318/160 |
| 4,587,621 | 5/1986 | DuVall | 364/577 |
| 4,984,157 | 1/1991 | Cline et al. | 364/413.13 |
| 5,148,381 | 9/1992 | Sprauge | 364/723 |

*Primary Examiner*—Glenton B. Burgess
*Attorney, Agent, or Firm*—William H. Murray; N. Stephan Kinsella

[57] ABSTRACT

A pixel interpolation system provides for continuous scaling of an image, thus allowing for continuous modification of the size and aspect ratio of the image. A one-dimensional interpolator provides a weighted interpolation between two input pixels using a specified current interpolation weight. The weighting factor is then incrementally changed and further interpolations are sequentially performed across at least one dimension of the image. With one implementation of the system, the scaling across the image remains uniform while the weight varies from one pixel to the next to keep scaling constant. The interpolation operation of this invention may be performed simultaneously both vertically and horizontally.

18 Claims, 3 Drawing Sheets

CONTINUOUSLY CHANGING IMAGE SCALING PERFORMED BY INCREMENTED PIXEL INTERPOLATION

This is a continuation of application Ser. No. 08/461,547 filed on Jun. 5, 1995, abandon Jul. 8, 1996, which is a continuation of application Ser. No. 08/267,846 filed on Jun. 29, 1994, which is a continuation of U.S. application Ser. No. 07/995,288 filed on Dec. 23, 1992, all abandoned.

BACKGROUND OF THE INVENTION

1. Field of the Invention

This invention relates to the field of video processing and in particular to the interpolation of pixels within a video processing system.

2. Background Art

The use of pixel interpolation is well known in the field of video processing because in this field a great deal of pixel data must be stored, encoded, transmitted, decoded, scaled and shifted. So much pixel data is operated upon in video processing that even storing and retrieving the data are difficult. For example, D. L. Sprague, N. J. Fedele and L. D. Ryan in a U.S. patent application Ser. No. 918,275, filed 14 Oct. 1986, entitled "Non-Dedicated Image Memory Using Separate Bit-Nap Organizations For Luminance and Chrominance Variables", describe a system for retrieving stored images in digital form from video random-access memory (VRAM).

The VRAM taught in Sprague et al. is a dual-ported memory including a dynamic random-access memory with a random-access read/write port. It also includes a relatively small, auxiliary, static, serial memory with a serial output port. The storage locations of the auxiliary memory may be loaded with pixel information in parallel from any row of storage locations in the larger dynamic memory upon command. Thereafter the auxiliary memory has its storage locations scanned by a counter operating as an address generator and it is read out in a shift register operation to supply a stream of video data.

In the system of Sprague et al., the pixels to be interpreted are described in terms of luminance and chrominance components. Each of the components has its own bit-map organization associated therewith in the dynamic memory portion of VRAM. Groups of bits descriptive of the luminance or chrominance of a pixel are stored together in a conformal mapping of the display in a bit-map-organized memory. The luminance components are generally more densely sampled in image field space than the chrominance components are. This is done to conserve image memory, recognizing that visual acuity for chrominance is less than that for luminance.

The VRAM is linearly packed. This means that the raster scanning of pixel codes is stored in successive rows of the dynamic memory. Rows in dynamic memory do not necessarily have a 1:1 correspondence with scan lines in the ultimate display. A formatter known as a "pixel unwrapper" takes a stream of data supplied to it from the VRAM serial output port and passes it into scan lines of successive pixel codes.

During line trace intervals in the display, VRAM supplies data from its output port. From this data the pixel-unwrapper generates a stream of pixel codes describing luminance in real time. During selected line retrace intervals in the display, VRAM supplies data from its serial output port from which data the pixel unwrapper generates two streams of pixel codes describing chrominance in a compressed-in-time and advanced-in-time format.

Each stream of chrominance components may be supplied to a respective chrominance re-sampling apparatus. Each re-sampling apparatus may comprise a respective odd-line line-storage memory, a respective even-line line-storage memory and a pixel interpolator.

Successive lines of each stream of compressed chrominance data are selected on an alternating basis for writing into its odd-line or its even-line line-storage memory. These line storage memories act as a rate-buffer to supply samples to their interpolator. The interpolator generates samples of the chrominance component with compression removed and with delay to temporally align them with the real-time luminance samples.

The luminance samples and two sets of chrominance samples are converted from digital to analog form and are linearly combined, for generating red, green and blue analog video signals. These analog video signals are amplified and gamma-corrected to provide drive signals for the display apparatus, typically a color kinescope.

The Sprague, Fedele and Ryan interpolator uses a cascade of n basic interpolator blocks and a multiplexer to re-sample each set of supplied chrominance samples $2^n$ times more densely in both the direction of pixel scan and direction of line advance. Each basic interpolator block includes three multiplexers, three adders, two clocked unit-delay latches and bit place shift circuitry. The teaching of this device is directed to interpolator circuitry for expanding video data that can be more readily programmed to do either 2:1 or 4:1 spatial interpolation and that reduces the amount of hardware associated with spatial interpolation. However, these operations may be very computationally intensive. Therefore it is desirable to perform interpolation, such as the interpolation taught by Sprague, Fedels and Ryan, using less time and/or less hardware circuitry.

It is known in the prior art that reduction of the complexity of the interpolation problem may be achieved by manipulating the interpolation equations. The simplest form of interpolation to attempt to reduce is in the field of one-dimensional interpolation. One-dimensional interpolation involves the weighted summation of two values, for example, as expressed by the equation:

$$I = xA + (1-x)B. \qquad \text{Equation (1)}$$

In this equation A and B are the two input values to be interpolated and x is the fractional weight term. The solution of this equation requires two add/subtract operations and two multiplications.

It is known to rearrange this equation to reduce it to the following form:

$$I = x(A-B) + B. \qquad \text{Equation (2)}$$

When the basic one-dimensional interpolation equation is rearranged into this form, the solution of the interpolation requires one subtraction, one addition, and one multiplication. Thus, this rearranged form requires one less multiplication. Because this rearranged form requires fewer mathematical operations, it is advantageous to design a circuit to solve the equation in this rearranged form. This advantage can be realized in the form of decreased space requirements on the semiconductor chip or in performing the interpolation more quickly using the same amount of space. However, it is desirable to further reduce the amount of space or time required to perform the interpolation.

U.S. Pat. No. 5,148,381, entitled "One-Dimensional Interpolation Circuit and Method Based on Modification of a Parallel Multiplier", filed Feb. 7, 1991, by Sprague teaches further reduction. The method of sprague starts by assuming that the fractional weight term of the interpolation, x, is a four bit unsigned binary number. Equation (1) may be scaled by sixteen to give:

$$16I = 16xA - 16xB + 16B \quad \text{Equations (3)}$$
$$= 16xA + (16-16x)B$$
$$= yA + (16-y)B$$

where:

$$y = 16x$$

and y is a four bit unsigned integer with values from zero to fifteen which may be the interpolation weight term.

Because interpolation weight term y was a four bit positive integer, $$16-y=\alpha y+1, \quad \text{Equation (4)}$$

where αy is the one's complement of y wherein each bit of y is complemented. Substituting Equation (4) into the right hand side of Equation (3) provides:

$$16I=yA+\alpha yB+B. \quad \text{Equation (5)}$$

A circuit suitable for the implementation of Equation (5), was provided by a modified multiplier array wherein things were substituted.

An implementation of an interpolator based on Equation (5) is generally more hardware efficient than prior art implementations based on either Equation (1) or Equation (2). The implementation based on Equation (5) needs one less subtractions compared with the implementation of Equation (2) because the implementation of Equation (5) does not require the generation of the (A–B) term required by the implementation of Equation (2).

The reason for the increase in efficiency provided by Equation (5) is that adders forming a multiplier in an implementation based on Equation (2) are not fully utilized when one or more bits of weight term y are equal to zero. In the case where one or more bits of y are equal to zero, the row of adders that corresponds to a zero bit of y simply passes the partial product on to the next stage. In the implementation of the present invention based on Equation (5), each stage of adders adds either an A term or a B term of the partial product. It will be understood by those skilled in the art that Equation (5) can be implemented by hardware or software.

Even though this method performs interpolations much more efficiently, it only interpolates in one dimension and in some applications it is advantageous to interpolate in more than one dimension. For example, it is known to perform interpolations in two and three dimensions. An example of the two-dimensional interpolation is multimedia applications. In these applications scaling may be used to allow a still or a motion video image to be displayed in an arbitrarily sized window covering a portion of the display device. Many methods for multi-dimensional interpolation are known. For example, it is known to perform such multi-dimensional interpolation as a series of one-dimensional interpolations.

Figure 1:
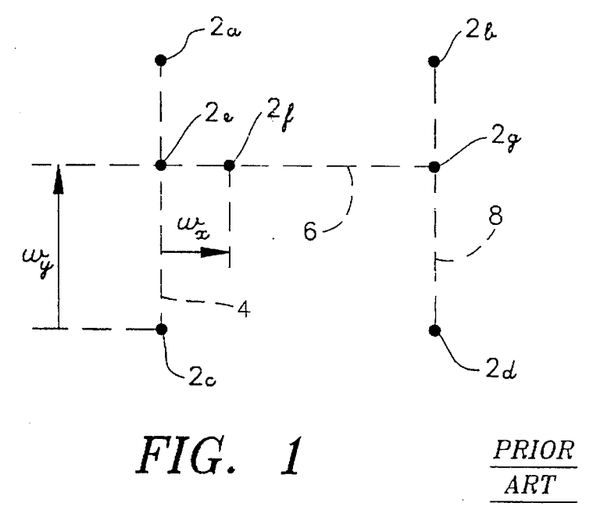
FIG. 1 shows a prior art two-dimensional pixel interpolation method.

Referring now to FIG. 1, there is shown prior art two-dimensional bilinear pixel interpolation method 1. It is known to perform two-dimensional bilinear interpolation pixel method 1 upon four input pixels 2a–d with two interpolation weights, a horizontal interpolation weight $w_x$ and a vertical interpolation weight $w_y$. In bilinear pixel interpolation method 1, input pixels 2a–d are positioned horizontally and vertically adjacent with respect to each other and pixel 2f is a value between pixels 2a–d which is determined by the interpolation process.

The value of pixel 2f between pixels 2a–d may be calculated, for example, by a sequence of conventional one-dimensional interpolation. The interpolation of pixel 2a and pixel 2c to determine pixel 2e may be performed along dotted line 4 according to vertical interpolation weight $w_y$. The interpolation of pixel 2b and pixel 2d to form pixel 2g may be performed along dotted line 8, also according to vertical interpolation weight $w_y$. The interpolation of pixel 2e and pixel 2g to determine pixel 2f may then be performed along dotted line 6 according to horizontal interpolation weight $w_x$.

The bilinear interpolation operation of method may be performed as three one-dimensional interpolations: (1) pixel 2e=(pixel 2a, pixel 2c), (2) pixel 2g=(pixel 2b, pixel 2d), and (3) pixel 2f=(pixel 2e, pixel 2g). In this formulation (pixel m, pixel n) represents a conventional one-dimensional linear interpolation between pixel m and pixel n, for example, as set forth in Equation (5). In some applications which are sequentially repeated, it is possible that only two interpolations rather than three may be performed in order to practice bilinear pixel interpolation method 1. The result of one of the one-dimensional interpolations, for example pixel 2g= (pixel 2b, pixel 2d), may be remembered from the previous two-dimensional interpolation operation.

SUMMARY OF THE INVENTION

A pixel interpolation system provides uniform scaling of images. A one-dimensional interpolation provides a weighted sum of a pair of input pixels at a pixel position using a current interpolation weight. The interpolation weight is then incremented modulo one. A further one-dimensional interpolation is performed upon a pair of input pixels in accordance with the modified interpolation weight. The pixel pair of this further interpolation may be the same as the previous one or it may be the next pair. The carry from the modulo one addition indicates whether the interpolation is performed on the first or second pair of pixels. This process is repeated across at least one dimension of the image. The scaling across this dimension therefore remains uniform while the weight varies from one pixel position to the next as required to keep the scaling constant.

DETAILED DESCRIPTION OF THE INVENTION

Figure 2A:
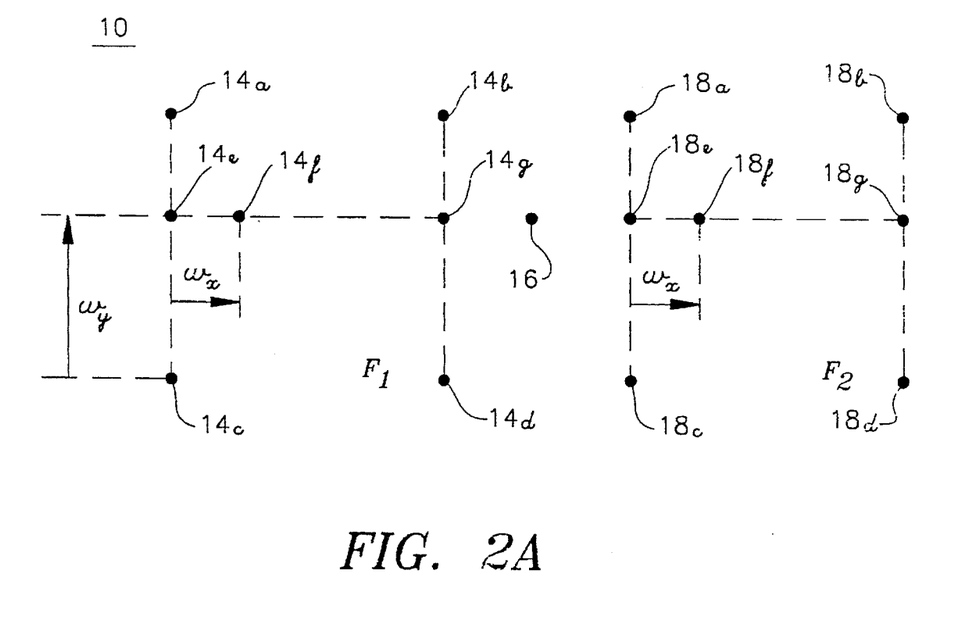
FIGS. 2A,B show a planar representation and a perspective representation of the three-dimensional pixel interpolation method of the present invention.
Figure 2B:
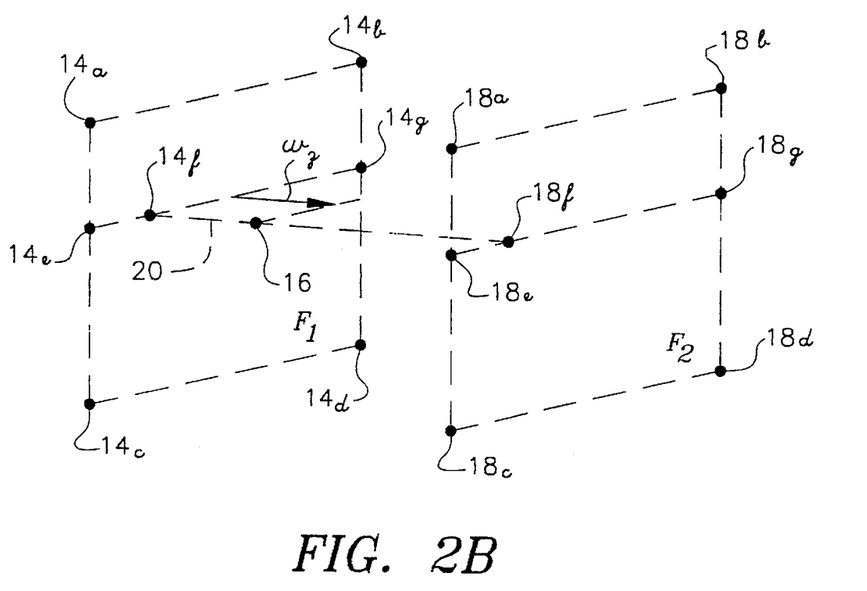

Referring now to FIGS. 2A,B, there are shown planar and perspective representations of three-dimensional pixel interpolation method 10 of the present invention. Three-dimensional pixel interpolation method 10 receives four input pixels 14a–d, which may be disposed within a first image frame $F_1$, and four input pixels 18a–d, which may be disposed within a second image frame $F_2$. Pixel interpolation method 10 interpolates these eight input pixels 14a–d, 18a–d to provide interpolated pixel 16 between the two parallel planes of image $F_1$ and image $F_2$.

Three-dimensional pixel interpolation method 10 of the present invention performs two-dimensional interpolations of the type previously described with respect to two-dimensional bilinear interpolation method 1. Thus, for example, pixel interpolation method 10 may perform a first one-dimensional interpolation within frame $F_1$, in the manner described with respect to interpolation method 1, to obtain pixel 14e=(pixel 14a, pixel 14c). A second interpolation according to interpolation method 1 may be performed to obtain pixel 14g=(pixel 14b, pixel 14d). These two results may then be interpolated by interpolation method 10 to provide pixel 14f wherein pixel 14f=(pixel 14e, pixel 14g).

Three-dimensional pixel interpolation method 10 of the present invention may then operate upon frame $F_2$. The operation upon frame $F_2$ again uses the one-dimensional interpolations of two-dimensional bilinear interpolation method 1. In this manner, pixel 18e=(pixel 18a, pixel 18c) is determined as well pixel 18g=(pixel 18b, pixel 18d). These two results may then be interpolated within frame $F_2$ by pixel interpolation method 10 to provide pixel 18f wherein pixel 18f=(pixel 14e, pixel 14g).

Performing these two two-dimensional bilinear operations thus provides pixels 14f, 18f within three-dimensional pixel interpolation method 10. Pixels 14f, 18f are disposed within frames $F_1$ and $F_2$ respectively. It will be understood that the two-dimensional interpolation operations performed to determine pixels 14f, 18f within interpolation method 10 require only two, rather than three, one-dimensional interpolations as previously described with respect to pixel interpolation method 1, if the result of a previous interpolation can be saved. A further one-dimensional interpolation may then be performed upon two-dimensionally interpolated pixels 14f, 18f along dotted line 20 perpendicular to the planes of frames $F_1$ and $F_2$. This further interpolation is effective to determine three-dimensionally interpolated pixel 16. It may be done with a weight $w_z$ or as a simple average.

Thus it will be understood that a three-dimensional interpolation of the eight input pixels 14a–d, 18a–d to determine interpolated pixel 16, may be performed using five one-dimensional interpolations. Two one-dimensional interpolations in accordance with bilinear interpolation method 1 are required to obtain pixel 14f within frame $F_1$ provided that the results of a preceding one-dimensional interpolation may be saved and reused. In the same manner, two one-dimensional interpolations are required to determine pixel 18f within frame $F_2$ from input pixels 18a–d. The fifth one-dimensional interpolation required is the interpolation between pixel 18f and pixel 14f as previously described to obtain pixel 16 between frames $F_1$ and $F_2$.

Figure 3:
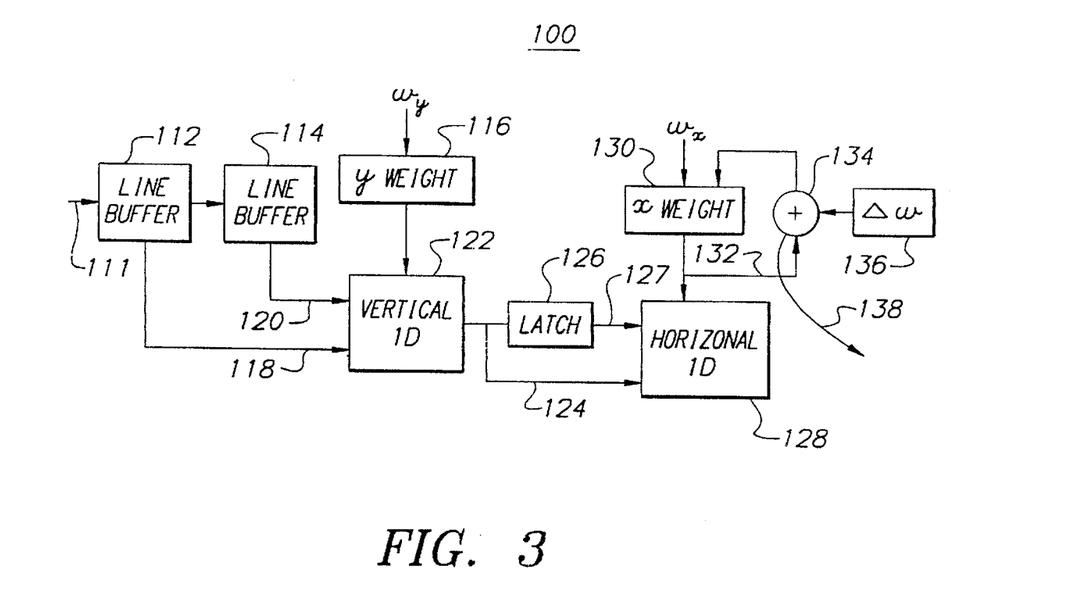
FIG. 3 shows a schematic representation of the uniform scaling two-dimensional pixel interpolation circuitry of the present invention.

Referring now to FIG. 3, there is shown uniform scaling two-dimensional pixel interpolation circuitry 100. Uniform scaling pixel interpolation circuitry 100 may be used to perform substantially any conventional two-dimensional interpolation. For example, pixel interpolation circuitry 100 may be used to perform the two-dimensional interpolation operations of pixel interpolation method 1 as well as the two-dimensional interpolations required to obtain pixels 14f, 18f of three-dimensional interpolation method 10. However, pixel interpolation circuitry 100 is optimized for interpolating images wherein a common interpolation scaling factor is applied along the horizontal dimension of an image and a common scaling factor is applied along the vertical dimension. The horizontal and vertical scaling factors within interpolation circuitry 100 need not be the same.

Thus uniform scaling pixel interpolation circuitry 100 is particularly useful for performing the operation of shifting video images wherein the shifting operation is performed with uniform scaling. Two-dimensional pixel interpolation circuitry 100, or uniform scaling pixel interpolation circuitry 100, may be used when shifting an image with uniform scaling by a fractional pixel distance. Thus, for example, pixel interpolation circuitry 100 may be advantageously applied to the problem of scaling and shifting images wherein a corner of an image is shifted, thereby continuously changing the aspect ratio of the image.

The scaling and shifting of images are common, for example, in the field of graphics and in the field of display windows. In the field of display windows one image may be scaled into a window within another image and the two images may be displayed simultaneously. Using uniform scaling pixel interpolation circuitry 100, a display window may be stretched into different aspect ratios by applying different uniform scaling factors to the horizontal and vertical dimensions of the image. This advantageous feature is available within uniform scaling pixel interpolation circuitry 100 because interpolation circuitry 100 permits the use of different interpolation weights in the horizontal and vertical dimensions of an image.

An input bit stream representative of a display image is received by pixel interpolation circuitry 100 by way of interpolator input line 111. The input bit stream of interpolator input line 111 is applied to line buffer 112. The output of line buffer 112 is applied to input of line buffer 114. The delay of passing through line buffer 114 may permit the signal provided at output line 120 of line buffer 114 to be delayed by one raster scan with respect to the signal at output 118 of block 112.

For example, at time $t_i$, when the output of line buffer 114 may correspond to pixel 14a, the output of line buffer 112 may correspond to pixel 14c. Thus, it will be understood that if the delay of line buffer 114 is one raster scan, the pixels on output lines 118, 120 are vertically adjacent to each other. Furthermore, at some later time, time $t_{i+1}$, the output of line buffer 114 may represent pixel 14d and the output of line buffer 112 may represent pixel 14b which is vertically adjacent to pixel 14d. It will be understood that programmed refetches of pixels may be used to perform the functions of line buffers 112, 114.

Thus, when interpolation circuitry 100 processes the pixels of frame $F_1$, vertically adjacent output pixels 14a,c and vertically adjacent pixels 14b,d are applied to vertical one-dimensional interpolator 122 by way of vertical interpolator input lines 118, 120, respectively, at times $t_i$ and $t_{i+1}$. Also applied to vertical one-dimensional interpolator 122 is a value representative of the vertical interpolation weight $w_y$. The interpolation weight $w_y$ is applied by vertical interpolation weight register 116 in order to determine an interpolated value between the vertically adjacent inputs such as pixels 14a,c and 14b,d.

The interpolated output value pixel 14e=(pixel 14a, pixel 14c) of vertical interpolator 122 is then formed by interpolator 122 when pixels 14a,c of frame $F_1$, are applied by way of interpolator lines 118, 120. It will be understood that the same operations performed upon pixels 14a,c by one-dimensional interpolator 122 at time $t_i$ to provide pixel 14e may also be performed upon pixels 14b,d at time $t_{i+1}$, by interpolator 122 to form interpolated pixel 14g=(pixel 14b, pixel 14d).

Horizontal one-dimensional interpolator 128 receives the pixel 14e from the output of vertical one-dimensional interpolator 122 directly by way of interpolator input line 124. In addition to pixel 14e, applied directly to horizontal interpolator 128, a delayed output value from vertical interpolator 122 is applied by way of interpolator input line 127 to horizontal one-dimensional interpolator 128. The delayed value is applied to horizontal interpolator 128 by way of delay latch 126. When the delay caused by delay latch 126 is one pixel position, the interpolation of pixels 14a,c, pixel 14e, and the interpolation of pixels 14b,d, pixel 14g, are applied to horizontal interpolator 100 simultaneously.

Thus both interpolated values pixel 14e=(pixel 14a, pixel 14c) and pixel 14g=(pixel 14b, pixel 14d) may be applied to horizontal one-dimensional interpolator 128 simultaneously. Horizontal one-dimensional interpolator 128 then performs the interpolation pixel 14f=(pixel 14e, pixel 14g) to determine interpolated pixel 14f in accordance with a value representative of the horizontal interpolation weight $w_x$ received by way of line 132.

Horizontal interpolation weight register 130 of pixel interpolation circuit 100 provides the interpolation weight $w_x$ in accordance with a constant weight increment $\Delta w$ received from weight increment register 136. The weight increment term $\Delta w$ is reapplied to the weight $w_x$ of line 132 at each pixel position along the horizontal dimension of a scaled image within pixel interpolation circuitry 100.

At each such position, summing node 134 receives the current weight value applied by horizontal weight register 130 to horizontal interpolator 128 by way of line 132. The interpolation weight increment $\Delta x$ of horizontal weight register 136 is applied to summing node 134 in addition to the current weight value $w_x$. The sum of the current weight value $w_x$ and the weight increment $\Delta w$ is then applied by interpolation weight register 130 to horizontal interpolator 128. In this manner a fixed point increment is performed on the horizontal weight at each horizontal pixel position during the scaling process within pixel interpolation circuitry 100.

The function of items such as register 130, node 134 and weight increment register 136 within pixel interpolation circuitry 100 may be performed by differential analyzers which are known to those skilled in the art. The use of weight increment register 136 within interpolation circuitry 100 eliminates the need to repeatedly recalculate the current weight term $w_x$ applied to one-dimensional horizontal interpolator 128 by way of line 132.

Summing node 134 also provides a carry out signal or a weight carry signal on carry out line 138. A carry out on line 138 indicates that register 130 storing the current weight term of line 132 has crossed over zero, modulo 1. This carry-out value may be used to control conditional execution and conditional branching to permit control of the output pixel rate relative to the input pixel rate. For an example of condition execution and branching, see U.S. patent application Ser. No. 07/782,332, filed Oct. 24, 1991 by Sprague, et al, which is incorporated by reference herein. It will be understood that the operations performed upon register 130 by weight increment register 136 and summing node 134 may also be performed upon register 116 to provide uniform scaling in the vertical direction.

Figure 4:
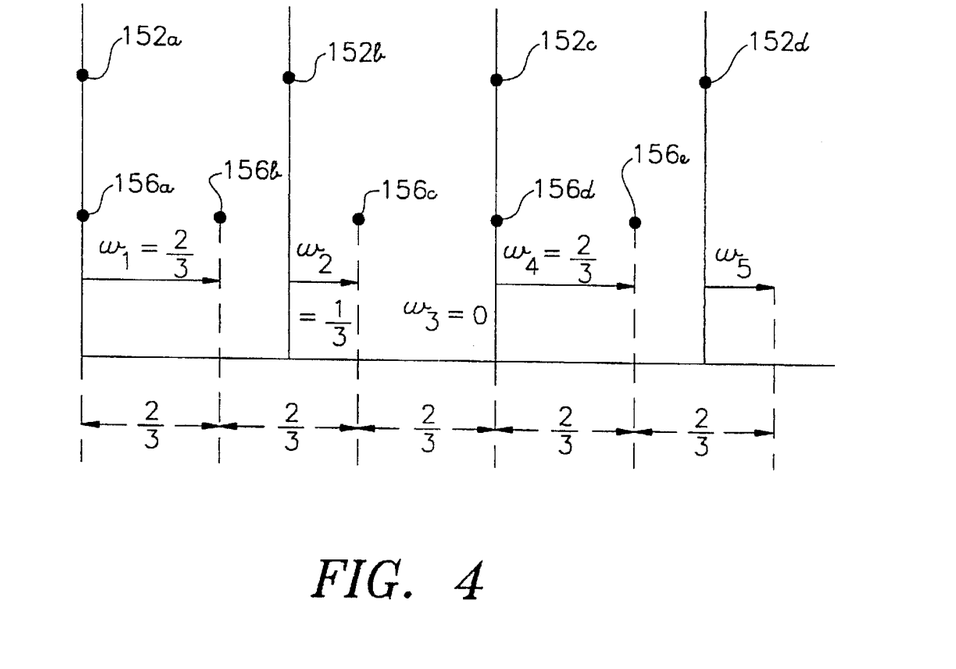
FIG. 4 shows a graphical representation of a scaling down operation performed by the pixel interpolation circuitry of FIG. 3.

Referring now to FIG. 4, there is shown pixel scaling chart 170. Pixel scaling chart 170 illustrates the scaling up of four input pixels 152a–d using, for example, two-dimensional pixel interpolation circuit 100 of the present invention. It will be understood that when pixel interpolation circuit 100 scales up an image it generates more pixels in its output stream than were received in its input stream. For example, scaling up four input pixels 152a–d generates five output pixels 156a–e in the example of scaling chart 170. Furthermore, it will be understood that pixel interpolation circuit 100 is effective to scale up or to scale down depending on whether the value $\Delta w$ of weight increment register 136 is greater than one or less than one.

In the beginning of the interpolation, scaled pixel value 156a may appear substantially unchanged compared with original pixel 152a if there is an initial weight value of zero in register 130. An incremental weight $\Delta w$ of two-thirds is then applied by weight increment register 136 to summing node 134. The value of two-thirds is applied by summing node 134 to horizontal interpolation weight box 130 which applies the value to one-dimensional horizontal interpolator 128. This results in a weight $w_1=\frac{2}{3}$ being applied to interpolator 128 to provide interpolated pixel 156b. Thus interpolated pixel 156b is determined by interpolating input pixels 152a,b with a weight of $w_1$.

The value of two-thirds which is applied by horizontal interpolation weight box 130 to horizontal interpolator 128 is also applied to summing node 134 by way of line 132. Summing node 134 adds the value two-thirds received from line 132 to the incremental value two-thirds received from box 136 to provide an output value of one-third with a carry out of one on carry out line 138. Thus, interpolated pixel 156c is determined using an interpolation weight $w_2=\frac{1}{3}$. The carry out provided by summing node 134 signals a system processor that the interpolation is to be performed upon the next pair of input pixels, pixels 152b,c. It will be understood that interpolation has thus proceeded from pixels 152a,b to pixels 152b,c in response to the signal of the carry-out line 138.

The value of one-third applied to one-dimensional horizontal interpolator 128 is also applied to summing node 134 as previously described. Summing node 134 adds the value one-third received from line 132 to the value two-thirds received from weight box 36 to provide a sum of zero with another carry-out of one on carry out line 138. The sum of zero is placed in box 130 and applied to one-dimensional interpolator 128. The carry-out of line 138 signals the processor to use the next pair of input pixels, pixels 152c,d. However, since the weight received by horizontal interpolator 28 is $w_3=0$ the resulting interpolated pixel 156d is not changed with respect to input pixel 152c.

It will be understood by those skilled in the art that the weights $w_1$, $w_2$, $w_3$ provided within two-dimensional pixel interpolation circuit 100 repeat from this point forward. For example, weight $w_4$ determined by summing node 134 is equal to weight $w_1$. Weight $w_5$ is equal to weight $w_2$. Furthermore, the interpolation operations advance from one pair of adjacent pixels to the next pair of adjacent pixels in the same manner as described with respect to pixels 152a–d.

These results are summarized in Table 1 for $\Delta w=\frac{2}{3}$. The value of $\Delta w$ may be determined as the ration of the number of pixels in the input image to the number of pixels in the output image during scaling up operations. In the preferred embodiment the $\Delta w$ may be limited to the range $0.5 \leq \Delta w \leq 2$. Multiple passes may thus be used to obtain the closest factor of two and a fractional scale value may be used to obtain the final image size as set forth hereinbelow.

TABLE 1

| Output Pixel | Weight | $C_o$ | Interpolated Pixel |
|---|---|---|---|
| 156a | $w_0 = 0$ | 0 | 152a,b |
| 156b | $w_1 = \frac{2}{3}$ | 0 | 152a,b |
| 156c | $w_2 = \frac{1}{3}$ | 1 | 152b,c |
| 156d | $w_3 = 0$ | 1 | 152c,d |
| 156e | $w_4 = \frac{2}{3}$ | 0 | 152c,d |

Figure 5:
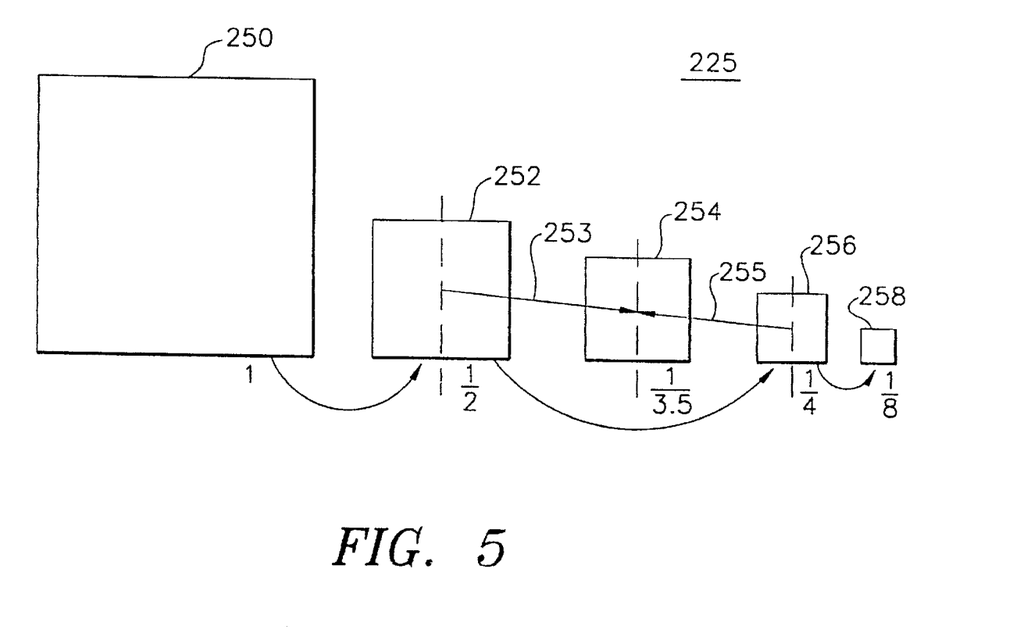
FIG. 5 shows a further three-dimensional pixel interpolation method of the present invention.

Referring now to FIG. 5, there is shown two-dimensional interpolation method 225. Two-dimensional interpolation method 225 of the present invention is useful for the purpose of scaling video images using scaling factors which are not reciprocal integer powers of two. Using this method original image 250 is first scaled down by one-half to generate smaller filtered image 252. Filtered image 252 may then be scaled down by one-half to provide smaller filtered image 256. Filtered image 256 may then be scaled down by one-half to provide smaller filtered image 258. It is possible to provide any number of successive filtered images which are decreased in size by one-half each time by repeatedly filtering horizontally and vertically by a factor of two.

Thus using only the type of successive scaling down by one-half described thus far yields only scaling wherein the scaling factor is a reciprocal integer power of two, such as filtered image 252, having a scaling factor of ½ times, filtered image 256, having a scaling factor of ¼ times, and filtered image 258, having a scaling factor of ⅛ times. However, based upon images 250, 252, 256 two-dimensional interpolation method 225 of the present invention may be used to provide scaling which is not limited to integer scaling factors.

For example, starting image 250 may be scaled down with a scaling factor of $\frac{1}{3.5}$ times to determinate interpolated image 254. In order to scale starting image 250 down by a factor which is not an integer power of two, a determination is made which integer scaling factor is the closest to the desired one. It will be understood that the two scaling factors closest to $\frac{1}{3.5}$ times are ½ times and ¼ times. Thus, the closest filtered images to the required interpolated image 254 are filtered images 252, 256 which correspond to scaling factors ½ times and ¼ times.

The method of the present invention may then be performed in either of two directions. Method 225 of the present invention may start with filtered image 252 and scale down to interpolated image 254 as indicated by arrow 253. Alternately method 225 may start with filtered image 256 and scale up to image 254. Less information is lost if interpolation starts with the filtered image 252 and scales down.

In the preferred embodiment of the method of the present invention, off-line processing of starting image 250 is performed using very high order filters (not shown) to generate video images 252, 256, 258. High order filters of the type required for this purpose are well known to those skilled in the art. Then a high-speed interpolation system is provided for arbitrary scaling between any two of the integer reciprocal scale factors to generate images between images 250, 252, between images 252, 256 and between images 256, 258. For example, interpolation methods 1, 10 and uniform scaling pixel interpolation circuitry 100 may be used for providing a weighted interpolation image. Alternatively, a simple average between the two adjacent images may be performed.

While this invention has been described with reference to specific and particularly preferred embodiments thereof, it is not limited thereto and the appended claims are intended to be construed to encompass not only the specific forms and variants of the invention shown but to such other forms and variants as may be devised by those skilled in the art without departing from the true scope of this invention.

I claim:

1. A pixel interpolation system for uniform scaling of images having a plurality of input pixels and pixel positions, the pixel interpolation system comprising:

(a) first and second line buffer means for receiving an input pixel stream and for providing a plurality of pixel pairs that are delayed by one scan line, wherein each pixel pair of the plurality of pixel pairs comprises vertically adjacent pixels, wherein the first line buffer means is coupled at its input to the input pixel stream and the second line buffer means is coupled at its input to an output of the first line buffer means;

(b) means for providing a first sequence of interpolation weights;

(c) vertical one-dimensional interpolation means for receiving the plurality of pixel pairs and the first sequence of interpolation weights to provide a plurality of vertically-interpolated pixels comprising a plurality of sequential weighted sums of the pixel pairs at a first plurality of the pixel positions in accordance with the first sequence of interpolation weights;

(d) delay latch means for delaying one pixel of two consecutive vertically-interpolated pixels to provide a plurality of pairs of horizontally adjacent, vertically-interpolated pixels;

(e) means for providing a second sequence of interpolation weights; and (f) horizontal one-dimensional interpolation means for receiving the plurality of pairs of vertically-interpolated pixels and the second sequence of interpolation weights to provide a plurality of sequential weighted sums of the pairs of vertically-interpolated pixels at a second plurality of the pixel positions in accordance with the second sequence of interpolation weights; wherein the delay latch means is coupled at its input to the output of the vertical one-dimensional interpolator and to a first input of the horizontal one-dimensional interpolator and at its output to a second input of the horizontal one-dimensional interpolator.

2. The system of claim 1, wherein means (e) comprises:

(1) weight register means for storing a current interpolation weight corresponding to a current pixel pair of the plurality of pairs of vertically-interpolated pixels;

(2) means for applying an initial interpolation weight to the weight register means;

(3) weight increment means for supplying a constant interpolation weight increment; and (4) summing node means coupled to the weight register means and to the weight increment means for receiving the current interpolation weight, adding the constant interpolation weight increment to the current interpolation weight increment to produce a new current interpolation weight, and applying the new current interpolation weight to the weight register means to update the current interpolation weight, wherein the summing node means comprises means for providing a weight carry signal produced in accordance with the adding.

3. The pixel interpolation system of claim 2, wherein the horizontal one-dimensional interpolation means selectively performs successive interpolations on the same pixel pair and on differing pixel pairs in accordance with the weight carry signal.

4. The pixel interpolation system of claim 2, wherein conditional executions are performed in accordance with said weight carry signal.

5. The pixel interpolation system of claim 2, wherein:
the first and second line buffer means comprise means for retrieving further input pixels from the input pixel stream in response to the weight carry signal.

6. The pixel interpolation system of claim 1, wherein consecutive interpolation weights of the sequence of interpolation weights differ by a constant interpolation weight increment and consecutive interpolation weights of the second sequence of interpolation weights differ by a second constant interpolation weight increment.

7. The pixel interpolation system of claim 6, wherein the constant interpolation weight increment is greater than or equal to 0.5 and less than or equal to 2.

8. The pixel interpolation system of claim 1, wherein means (a)–(f) are applied to input pixels of a first image to generate at least one first image interpolated pixel and to input pixels of a second image to generate at least one second image interpolated pixel, interpolation is performed between pixel pairs of the at least one first image interpolated pixel and the at least one second image interpolated pixel to generate at least one three-dimensional interpolated pixel.

9. A pixel interpolation method for uniform scaling of images having a plurality of input pixels and pixel positions, the method comprising the steps of:
 (a) receiving with first and second line buffer means an input pixel stream and providing with the first and second line buffer means a plurality of pixel pairs that are delayed by one scan line, wherein each pixel pair of the plurality of pixel pairs comprises vertically adjacent pixels, wherein the first line buffer means is coupled at its input to the input pixel stream and the second line buffer means is coupled at its input to an output of the first line buffer means;
 (b) providing a first sequence of interpolation weights;
 (c) receiving with a vertical one-dimensional interpolation means the plurality of pixel pairs and the first sequence of interpolation weights and providing with the vertical one-dimensional interpolation means a plurality of vertically-interpolated pixels comprising a plurality of sequential weighted sums of the pixel pairs at a first plurality of the pixel positions in accordance with the first sequence of interpolation weights;
 (d) delaying with a delay latch means one pixel of two consecutive vertically-interpolated pixels to provide a plurality of pairs of horizontally adjacent, vertically-interpolated pixels;
 (e) providing a second sequence of interpolation weights; and
 (f) receiving with a horizontal one-dimensional interpolation means the plurality of pairs of vertically-interpolated pixels and the second sequence of interpolation weights and providing with the horizontal one-dimensional interpolation means a plurality of sequential weighted sums of the pairs of vertically-interpolated pixels at a second plurality of the pixel positions in accordance with the second sequence of interpolation weights.

10. The method of claim 9, wherein step (e) comprises the steps of:
 (1) storing in a weight register means a current interpolation weight corresponding to a current pixel pair of the plurality of pairs of vertically-interpolated pixels;
 (2) applying an initial interpolation weight to the weight register means;
 (3) supplying a constant interpolation weight increment to a summing node means coupled to the weight register means;
 (4) receiving said current interpolation weight with the summing node means;
 (5) adding the constant interpolation weight increment to the current interpolation weight increment to provide a new current interpolation weight; and
 (6) applying the new current interpolation weight to the weight register means to update the current interpolation weight, wherein the summing node means comprises means for providing a weight carry signal produced in accordance with the adding of step (e)(5).

11. The pixel interpolation method of claim 10, further comprising the step of:
 (g) selectively performing successive interpolations on the same pixel pair and on differing pixel pairs in accordance with the weight carry signal.

12. The pixel interpolation method of claim 10, further comprising the step of:
 (g) performing conditional executions in accordance with said weight carry signal.

13. The pixel interpolation method of claim 10, wherein:
the first and second line buffer means comprise means for retrieving further input pixels from the input pixel stream in response to the weight carry signal.

14. The pixel interpolation method of claim 9, wherein consecutive interpolation weights of the sequence of interpolation weights differ by a constant interpolation weight increment and consecutive interpolation weights of the second sequence of interpolation weights differ by a second constant interpolation weight increment.

15. The pixel interpolation method of claim 14, wherein the constant interpolation weight increment is greater than or equal to 0.5 and less than or equal to 2.

16. The pixel interpolation method of claim 9, further comprising the steps of:
 (j) generating at least one first image interpolated pixel from input pixels of a first image and generating at least one second image interpolated pixel from input pixels of a second image in accordance with steps (a)–(i); and
 (k) interpolating between pixel pairs of the at least one first image interpolated pixel and the at least one second image interpolated pixel to generate at least one three-dimensionally interpolated pixel.

17. A pixel interpolation system for uniform scaling of images having a plurality of input pixels and pixel positions, the pixel interpolation system comprising:
 (a) a first line buffer coupled at its input to an input pixel stream, having first and second outputs;
 (b) a second line buffer coupled at its input to the first output of the first line buffer, having an output;
 (c) a first interpolation weight sequence generator and a second interpolation weight sequence generator;

(d) a vertical one-dimensional interpolator coupled to the first output of the second line buffer, to the second output of the first line buffer, and to the first interpolation weight sequence generator;

(e) a delay latch coupled at its input to an output of the vertical one-dimensional interpolator;

(f) a horizontal one-dimensional interpolator coupled to an output of the delay latch, to the output of the vertical one-dimensional interpolator, and to the second interpolation weight sequence generator; wherein:

the first output of the second line buffer and the second output of the first line buffer provide a plurality of pixel pairs that are delayed by one scan line, wherein each pixel pair of the plurality of pixel pairs comprises vertically adjacent pixels;

the vertical one-dimensional interpolator provides a plurality of vertically-interpolated pixels comprising a plurality of sequential weighted sums of the pixel pairs at a first plurality of the pixel positions in accordance with the first interpolation weight sequence;

the delay latch output and the output of the vertical one-dimensional interpolator provide a plurality of pairs of horizontally adjacent, vertically-interpolated pixels; and the horizontal one-dimensional interpolator provides a plurality of sequential weighted sums of the pairs of vertically-interpolated pixels at a second plurality of the pixel positions in accordance with the second interpolation weight sequence.

18. The system of claim 17, wherein the second interpolation weight sequence generator comprises:

(1) a weight register that stores an initial interpolation weight to the weight register means;

(2) a weight increment register having a constant interpolation weight increment; and (3) a summing node coupled at its inputs to an output of the weight register and to an output of the weight increment register and at its output to the input of the weight register.

\* \* \* \* \*